United States Patent
Boberg et al.

(10) Patent No.: US 9,762,621 B2
(45) Date of Patent: Sep. 12, 2017

(54) CALL ROUTING FOR IP MULTIMEDIA SUBSYSTEM USERS

(71) Applicant: TELEFONAKTIEBOLAGET L M ERICSSON (PUBL), Stockholm (SE)

(72) Inventors: Christer Boberg, Tungelsta (SE); Jonas Falkenå, Huddinge (SE); Timo Forsman, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 94 days.

(21) Appl. No.: 14/398,552

(22) PCT Filed: Sep. 21, 2012

(86) PCT No.: PCT/EP2012/068672
§ 371 (c)(1),
(2) Date: Nov. 3, 2014

(87) PCT Pub. No.: WO2013/164040
PCT Pub. Date: Nov. 7, 2013

(65) Prior Publication Data
US 2015/0117423 A1    Apr. 30, 2015

Related U.S. Application Data

(60) Provisional application No. 61/642,009, filed on May 3, 2012.

(51) Int. Cl.
*H04L 12/28* (2006.01)
*H04L 29/06* (2006.01)

(52) U.S. Cl.
CPC ...... *H04L 65/1016* (2013.01); *H04L 65/1006* (2013.01); *H04L 65/1069* (2013.01); *H04L 65/1073* (2013.01); *H04L 65/608* (2013.01)

(58) Field of Classification Search
CPC ................................................. H04W 50/0216
(Continued)

(56) References Cited

U.S. PATENT DOCUMENTS

| 2007/0189268 A1* | 8/2007 | Mitra | H04L 29/06027 370/352 |
| 2010/0299420 A1* | 11/2010 | Dahlin | H04L 29/12066 709/222 |
| 2011/0310888 A1 | 12/2011 | Merino Vazquez | |

FOREIGN PATENT DOCUMENTS

| WO | 2008101838 A2 | 8/2008 | |
| WO | WO2008101838 A2 * | 8/2008 | H04L 29/12 |

* cited by examiner

*Primary Examiner* — Iqbal Zaidi (57) ABSTRACT

A method of routing an IP Multimedia Subsystem, IMS, connection request sent by a user of a third party service, User A, towards a peer third party service user, User B, where the originating identity and target identity fields contain respectively external third party identities of User A and User B. The method comprises receiving said request at an IMS Access Gateway to an IMS network, and extracting said external identities and determining whether the extracted external identities are registered in respect of a wildcarded IMPU or wildcarded IMPUs that in turn is or are registered in the IMS network. In the event that these are registered, it is determined whether or not service logic is to be executed in the IMS network for both User A and User B and, if not, an IMS Edge Node routable identity associated with User B is determined. The IMS Edge Node routable identity is used to forward the IMS connection request to a terminating side IMS Edge Node.

21 Claims, 9 Drawing Sheets

(58) Field of Classification Search
USPC .................................. 370/401–509; 455/466
See application file for complete search history.

CALL ROUTING FOR IP MULTIMEDIA SUBSYSTEM USERS

RELATED APPLICATIONS

This application is a 371 of PCT/EP2012/068672, filed Sep. 21, 2012, and claims the benefit of U.S. Provisional Application No. 61/642,009, filed May 3, 2012, the disclosures of which are fully incorporated herein by reference.

TECHNICAL FIELD

The present invention relates to call routing for IP Multimedia Subsystem (IMS) users. In particular, though not necessarily, it relates to call routing using wildcarded IMS Public User Identities made available, for example, via a wholesale service.

BACKGROUND

IP Multimedia (IPMM) services provide a dynamic combination of voice, video, messaging, data, etc, within the same session. By growing the numbers of basic applications and the media which it is possible to combine, the number of services offered to the end users will grow, and the inter-personal communication experience will be enriched. This will lead to a new generation of personalised, rich multimedia communication services, including so-called "combinational IP Multimedia" services.

IP Multimedia Subsystem (IMS) is the technology defined by the Third Generation Partnership Project (3GPP) to provide IP Multimedia services over mobile communication networks. IMS provides key features to enrich the end-user person-to-person communication experience through the integration and interaction of services. IMS allows new rich person-to-person (client-to-client) as well as person-to-content (client-to-server) communications over an IP-based network. The IMS makes use of the Session Initiation Protocol (SIP) to set up and control calls or sessions between user terminals (or user terminals and application servers). The Session Description Protocol (SDP), carried by SIP signalling, is used to describe and negotiate the media components of the session. Whilst SIP was created as a user-to-user protocol, IMS allows operators and service providers to provide appropriate levels of Quality of Service (QoS), as well as to control user access to services and to charge users accordingly. Other protocols are used for media transmission and control, such as Real-time Transport Protocol and Real-time Transport Control Protocol (RTP/RTCP), A number of different identities are associated with the IMS, including private user identities—IP Multimedia Private Identity (IMPI)—and public user identities—IP Multimedia Public Identity (IMPU). Both IMPIs and IMPUs are Uniform Resource Identifiers (URIs) that can be a sequence of digits (a Tel URI) or alphanumeric identifiers (a SIP URI). IMS identities are stored in a subscriber database, referred to as a Home Subscriber Server (HSS), together with subscriber service profiles, service triggers and other information. Every IMS user shall have one or more IMPIs.

The IMPU is used by any user for requesting communications with other users and can be published (e.g. in phone books, web pages, business cards). Multiple IMPUs can be associated with a single IMPI. An IMPU can also be shared between several terminals, so that several terminals can be reached with the same identity (for example, a single phone-number may be shared by an entire family).

IMPUs may be stored in the HSS as wildcarded Public User Identities (wIMPUs). The wIMPU represents a collection of IMPUs that share the same service profile and are included in the same Implicit Registration Set (IRS), where an IRS is a group of IMPUs that are registered via a single registration request. When one of the IMPUs within the set is registered, all IMPUs associated with the IRS are registered at the same time. wIMPUs include a regular expression (reg exp) that defines the identities that should be matched and handled as defined for the wIMPU.

wIMPUs enable telecommunication network operators to cooperate with third party wholesale and corporate organisations who in turn maintain end user relationships, with those relationships not necessarily being known to the telecommunication network operators. Such arrangements mean that the end users are not themselves provisioned and thus able to register with the IMS system (using the HSS): it is only the identity of the wholesale partner or corporate organisation that is known and it is this identity that, for example, triggers the services that shall be executed (i.e. it is tied to a certain service profile). The approach assigns one or more wIMPUs to the wholesale partner (WSP) or corporate organisation, and users belonging to the partner or organisation will be associated with the wIMPU(s). In the following discussion, the term "WSP" (also "WP") is used to indicate both wholesale service providers and corporate organisations, or any other organisation that makes similar use of wIMPUs.

It is noted that certain references made below to the wIMPU should be taken as referring to that specific IMPU (from within the wIMPU range) that is registered by the WSP. Signalling for all users associated with the WSP will use the same, registered IMPU to allow for common service handling by the IMS.

A WSP will connect to the IMS network via an IMS Access Edge Gateway. This IMS Access Edge Gateway permits interconnection of two operator domains. [The IMS Access Edge Gateway may be collocated, as a front-end, with a Proxy Call Session Control Function (P-CSCF).] In this case, one of the domains is the IMS network whilst the other might be the Internet. As an example, one might consider an end user that subscribes to an Internet-based auction site. That auction site is the WSP in this example. A user (potential buyer) registers with the site using his or her external identity, i.e. an auction site username such as "userA.auction.com". The auction site returns a token to the user, and the user then performs a SIP registration with the IMS Access Edge Gateway of the IMS network, sending to the Gateway the user's external identity and the token. The IMS Access Edge Gateway then authenticates the user, identifies the relevant WSP/wIMPU, and records the association between the external identity and the wIMPU in a wholesale database.

Once registered, the user may click on a link on a web page of the auction site to set up a call to a seller of an advertised item. The buyer's terminal then sends a SIP INVITE to the IMS Access Edge Gateway. The P-preferred-Identity of the INVITE is the external identity of the buyer, while the Request-URI is the external identity of the seller. The IMS Access Edge Gateway performs a lookup on the wholesale database in order to identify the wIMPU associated with the buyer's external identity (as noted above, this wIMPU may be the "common" registered IMPU from within the wIPMU range). The IMS Access Edge Gateway includes the wIMPU in the P-profile-key field of the INVITE and forwards it towards the originating side S-CSCF where the INVITE is handled according to the wIMPU service profile. The presence of an entry in the P-profile-key field flags up to the S-CSCF and any Application Servers in the originating side signalling path that the INVITE should be handled using the wIMPU included within that field, rather than the external user identity (WSP) contained within the P-preferred-Identity. The INVITE will be further routed across the IMS to the terminating side S-CSCF, typically based upon the domain within which the seller resides, e.g. "auction.com". At the terminating side Interrogating Call Session Control Function (I-CSCF), that domain will be mapped to a wIMPU associated with the seller's WSP, and that wIMPU inserted into the P-profile-key field to allow appropriate handling of the INVITE by the terminating side S-CSCF and ASs.

A WSP such as an auction website may operate across a number of geographical regions. In order to correctly route traffic within a single IMS operator's domain (i.e. where the IMS network does not utilise sub-domains), the WSP will be allocated one or more different wIMPUs for each region. Of course, a given user may connect to the WSP from different regions in which case the wIMPU associated with that user may change from time to time. Routing the INVITE towards the destination is therefore problematic.

Within the IMS network, it would be possible to provide an interface between the I-CSCF and the wholesale database to allow the I-CSCF to fetch from that database the wIMPU associated with the WSP user identified in the Request-URI. This assumes of course that the wholesale database is dynamically updated with internal (wIMPU) and external (WSP) identity associations—this would be relatively easy when both the called and the calling party are registered with the same WSP. In the case of different regional wholesale databases, or where a number of WSPs interoperate, replication of a number of databases may be required.

Figure 1:
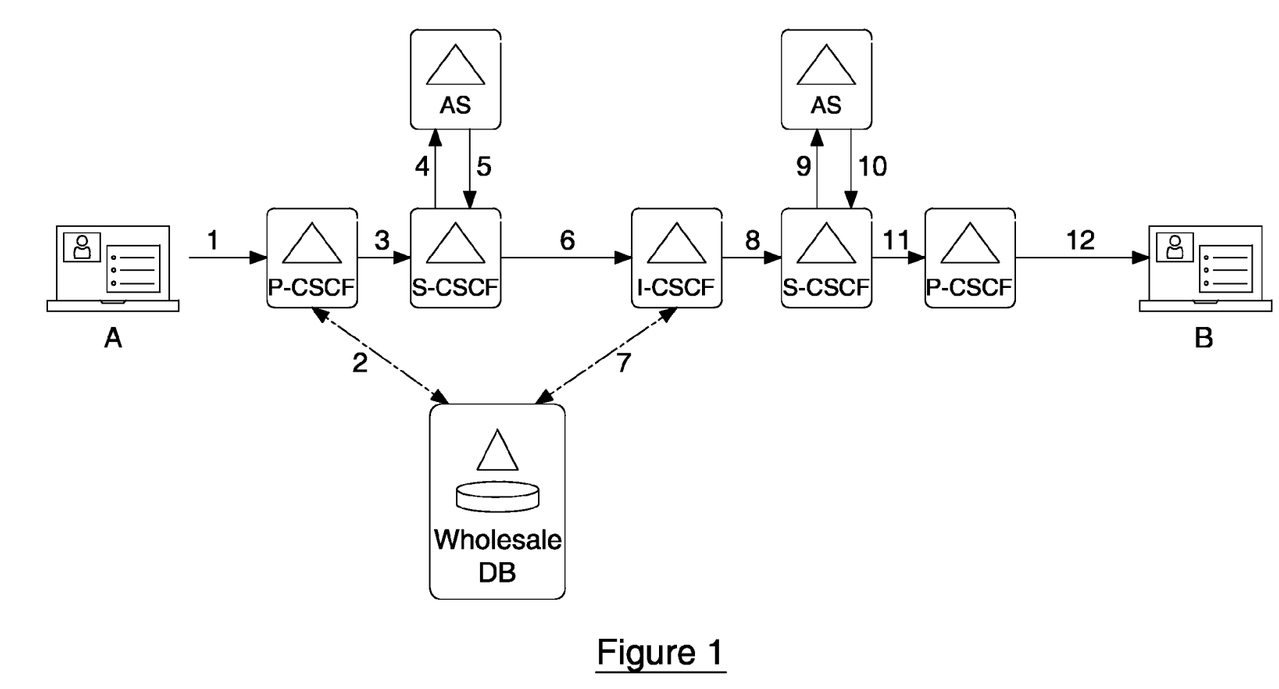
FIG. 1 illustrates schematically a possible mechanism for routing a SIP INVITE across an IMS network where the called and calling parties are associated with a wholesale service provider (or respective wholesale service providers)

FIG. 1 illustrates this possible approach, where signal 1 indicates the SIP INVITE sent by the calling party "A" in order to establish a connection to the called party "B". Signal 2 indicates the lookup stage which provides A's wIMPU to the P-CSCF on the originating call side (it is assumed that the IMS Access Edge Gateway is co-located with the P-CSCF). [NB. Signal 2 may not be required if the Gateway has cached the association between user A's external identity and the wIMPU.] Signals 3 to 6 indicate standard IMS setup signalling. The originating side S-CSCF and As(s) handle the INVITE according to user A's wIMPU included in the P-Profile-key field. Step 7 illustrates the lookup stage where the I-CSCF, on the terminating side, obtains user B's wIMPU using user B's external identity (or at least the domain part). Steps 8 to 12 indicate standard IMS setup signalling, where the terminating side S-CSCF and As(s) handle the INVITE according to user B's wIMPU included in the P-Profile-key field. [It is assumed of course that the terminals of users A and B both incorporate appropriate SIP clients.]

Figure 2:
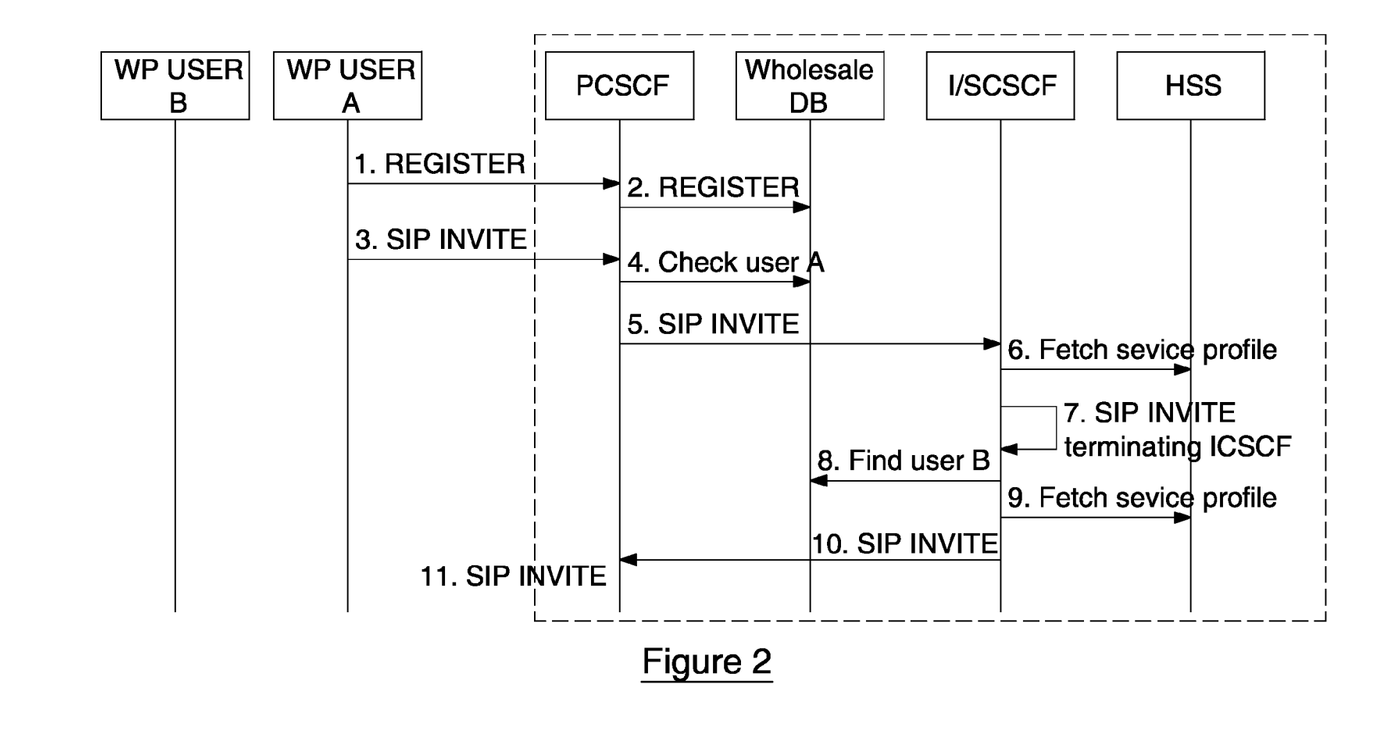
FIG. 2 illustrates signalling associated with the mechanism of FIG. 1.

FIG. 2 further illustrates this approach, and includes signalling to register the association of a user (A) with a wIMPU in the wholesale database. More particularly, the signalling consists of the following:

1. The WP user logs into an application that has voice capabilities and it sends a Register to the PCSCF (using SIP or e.g. HTTP via a terminal adapter) in order to be able to call and receive calls.
2. The PCSCF checks that this is a valid user and may also do certain things depending on the domain of the user such as fetching additional information from the WP but we assume now that all needed information is stored in the wholesale DB. The PCSCF checks the DB and also stores the relation between the user's external identity and the wIMPU used and the address, to this PCSCF.
3. User A wants to call User B and sends an Invite to the PCSCF.
4. The PCSCF may now check information of user A in the database but it is assumed that this data can also be cached at the PCSCF.
5. The PCSCF sends the request including the used wIMPU and the external identity of the calling party to the originating SCSCF.
6. The SCFCF fetches the service profile for the wIMPU of the originating user from the HSS to see if any services shall be executed (which is not the case for this call).
7. The originating SCSCF sends the request including the used external identity of the caller and the external identity of the callee to the terminating ICSCF (routing uses the domain of User B's external (WSP) identity).
8. The ICSCF checks the wholesale DB to find the SCSCF and possibly also the address of the PCSCF (this may not be needed since the SCSCF may have that as part of the contact information when the PCSCF registered the wIMPU.
9. The ICSCF sends it to the SCSCF which in turn fetches the service profile for the wIMPU of the terminating user from the HSS to see if any services shall be executed (which is not the case for this call).
10. The SCSCF sends the request to the PCSCF
11. The PSCF sends the request to user B

SUMMARY

According to a first aspect of the present invention there is provided a method of routing an IP Multimedia Subsystem, IMS, connection request sent by a user of a third party service, User A, towards a peer third party service user, User B, where the originating identity and target identity fields contain respectively external third party identities of User A and User B. The method comprises receiving said request at an IMS Access Gateway to an IMS network, and extracting said external identities and using them to determine whether or not service logic is to be executed in the IMS network for both User A and User B and, if not, for determining an IMS Edge Node routable identity associated with User B is determined. The IMS Edge Node routable identity is used to forward the IMS connection request to a terminating side IMS Edge Node.

In an embodiment of the invention, the IMS connection request is a SIP connection request, and said originating identity and target identity fields are the P-Preferred-Identity and Request-URI fields respectively.

The method may comprise determining whether the extracted external identities are registered in respect of a wildcarded IMPU or wildcarded IMPUs that in turn is or are registered in the IMS network and, if so, performing said step of determining whether or not service logic is to be executed in the IMS network.

The step of determining whether the extracted external identities are registered in respect of a wildcarded IMPU or wildcarded IMPUs may comprise sending the wildcarded IMPU(s) to an association database in a lookup request, said IMS Edge Node routable identity being identified at the association database and returned to the IMS Access Gateway. In the case that service logic is to be executed in the IMS network for one or both of User A and User B, the wildcarded IMPU of the or each User may be included in the IMS connection request. The wildcarded IMPU(s) may be included in a P-profile-key field.

According to a second aspect of the present invention there is provided IMS Access Gateway comprising a receiver for receiving an IP Multimedia Subsystem, IMS, connection request sent by a user of a third party service, User A, towards a peer third party service user, User B, where the originating identity and target identity fields contain respectively external identities of User A and User B. There is further provided a lookup entity for extracting from said request, the external identity contained in the target identity field, obtaining an IMS Edge Node routable identity associated with the external identity, and a sender for forwarding the request using said IMS Edge Node routable identity. The lookup entity may be configured to obtain a IMS Edge Node routable identity by sending a lookup request containing the extracted external identity to an association database, and receiving a response from the association database including said IMS Edge Node routable identity.

According to a third aspect of the present invention there is provided apparatus configured to operate as an association database and comprising a memory for recording associations between external user identities and registered wildcarded IMPUs, and, for each external user identity, for recording an indication of whether or not IMS service logic is required when an IMS call session is being established for the external user identity and an IMS Edge Node routable id. The apparatus further comprises an interface for coupling the apparatus to an IMS Access Gateway, and a processor for receiving lookup requests, received via said interface, from the IMS Access Gateway, a lookup request including external user identities of the originating and target users of a session establishment request. The processor is further configured to determine whether the extracted external identities are registered in the IMS network and, if so, to determine whether or not service logic is to be executed in the IMS network for both the originating and target user and, if not, to determine an IMS Edge Node routable identity associated with User B and sending this to the IMS Access Gateway via said interface.

The step of determining whether the extracted external identities are registered in the IMS network may comprise determining whether or not that are registered in the IMS in respect of wildcarded IMPUs.

According to a fourth aspect of the present invention there is provided computer program product comprising a computer-readable medium bearing computer program code embodied therein for use with a computer in order to route an IP Multimedia Subsystem, IMS, connection request sent by a user of a third party service, User A, towards a peer third party service user, User B, where the originating identity and target identity fields contain respectively external third party identities of User A and User B. The computer program code comprises code for receiving said request at an IMS Access Gateway to an IMS network, and code for extracting said external identities and determining whether the extracted external identities are registered in the IMS network and, if so, for determining whether or not service logic is to be executed in the IMS network for both User A and User B and, if not, for determining an IMS Edge Node routable identity associated with User B. The code further comprises code for using the IMS Edge Node routable identity to forward the IMS connection request to a terminating side IMS Edge Node.

The code for determining whether the extracted external identities are registered in the IMS network comprises code for determining whether or not they are registered in the IMS in respect of wildcarded IMPUs.

DETAILED DESCRIPTION

As discussed above, in order to map an external (wholesale service provider, corporate organisation, etc, referred to hereinafter as the WSP) identifier to a wildcarded internal IMS Public User Identity (wIMPU), an interface can be introduced between the I-CSCF and the wholesale database. This would allow the I-CSCF to perform a lookup operation upon receipt of a SIP message (e.g SIP INVITE) containing an external identifier in the Request-URI. (signal 7 in FIG. 1). However, such a lookup operation consumes additional resources and increases setup times, as well as presenting a problem vis-à-vis standard compliance.

It is proposed here to perform the lookup, and potentially include the called party's wIMPU, at the originating edge server, which in any case will have a connection to the association database (signal 2 in FIG. 1). The need for any further database look-up in the IMS system is avoided. Moreover, as the identity of the terminating user is determined already at the originating side, the terminating I-CSCF wholesale procedure is not needed and the request can be routed as usual to the terminating side S-CSCF.

Figure 3:
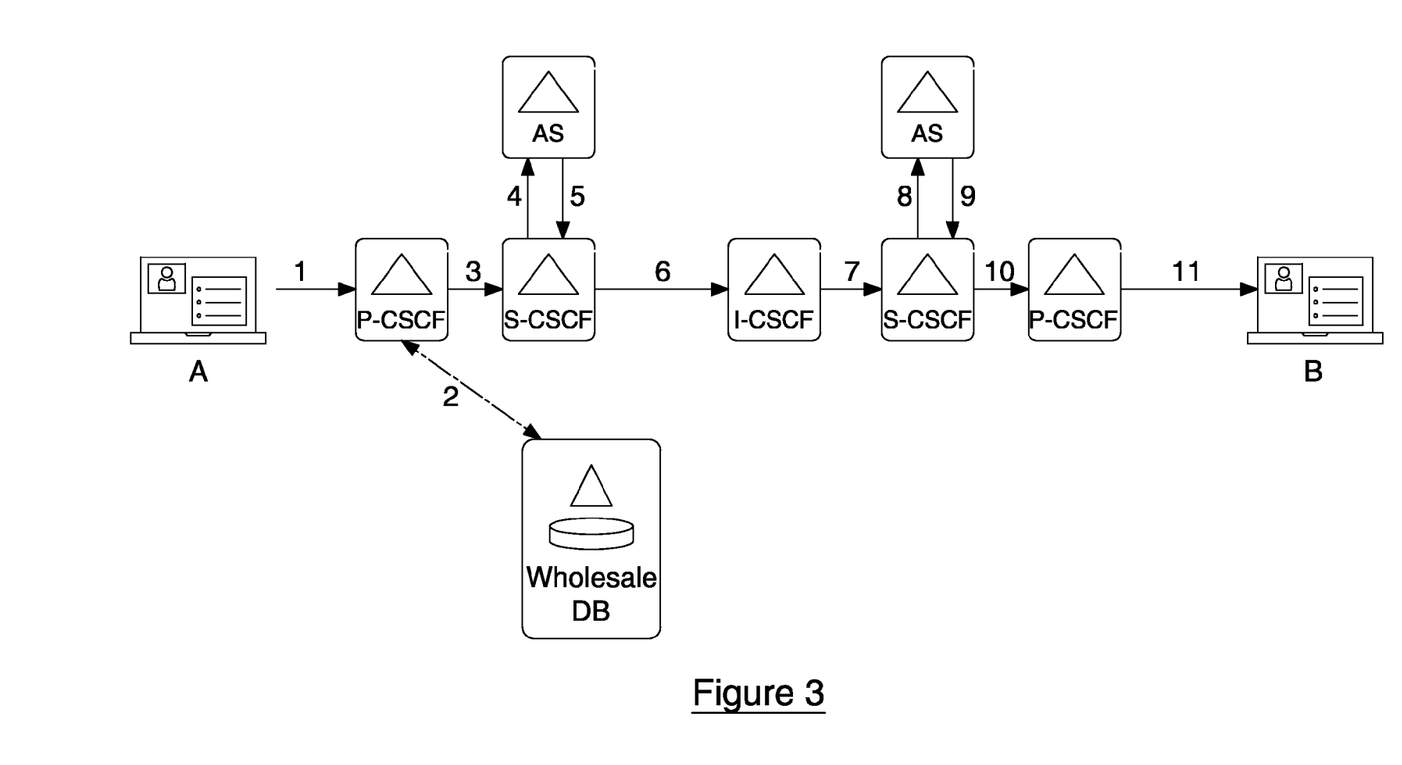
FIG. 3 illustrates an alternative for routing a SIP INVITE across an IMS network and comprising a single association database lookup step carried out at the originating side IMS Access Gateway (P-CSCF)

FIG. 3 illustrates schematically a (partial) call setup procedure between a calling party (originating side) A and a called party (terminating side) B. Various nodes and functions are omitted from the Figure for simplicity. The network architecture assumes that a network operator owns and controls the various IMS network nodes illustrated in the Figure, including the wholesale database (although this need not be the case).

Figure 4:
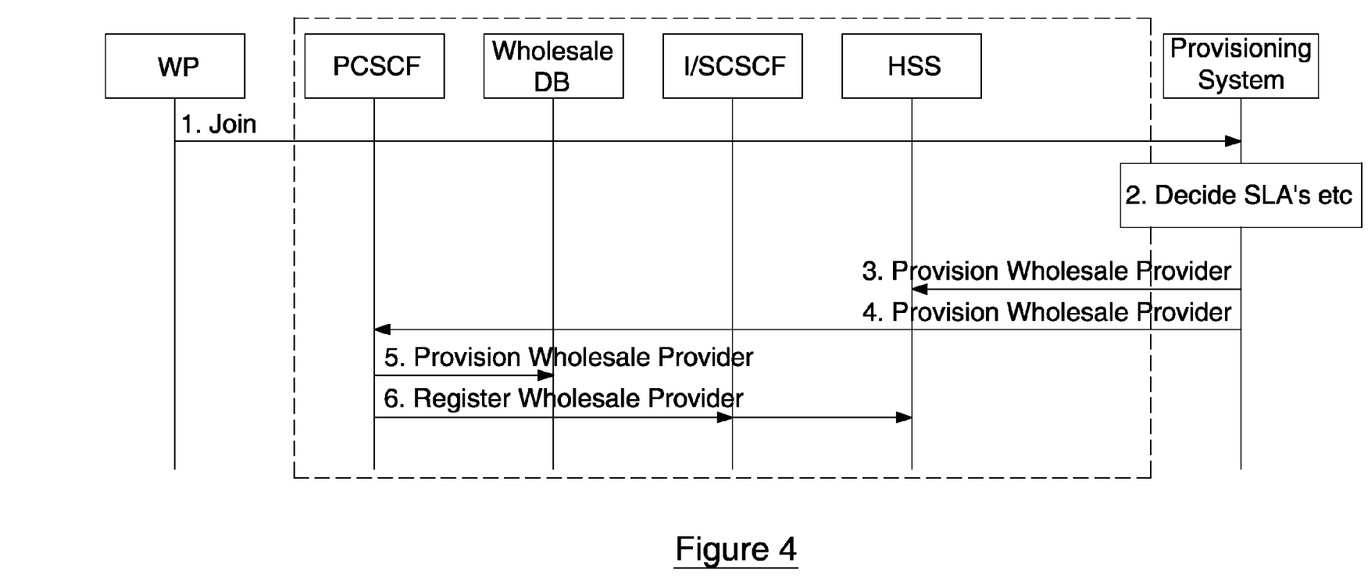
FIG. 4 illustrates a procedure for registering external (IMS) users with an association database (Wholesale DB) in respect of wildcarded IMPUs.

FIG. 4 illustrates, at a high level, a procedure for provisioning the WSP in the IMS, including provisioning the wholesale database (DB) and registering the wIMPU(s) [each wIMPU in fact being a distinct IMPU from within a wIMPU range] with the HSS. This assumes that some Service Level Agreement (SLA) is agreed between the WSP and the network operator. For each end user, an external (WSP) identity is assigned when the end user registers with the WSP service. This external identity is not provisioned in the IMS network, i.e. in the Home Subscriber Server (HSS). However, an association between that external identity and a wIMPU is created dynamically in the wholesale database. This procedure involves the user performing a SIP registration with the IMS Access Edge Gateway, for example using a token provided to the user by the WSP (website). The IMS Access Edge Gateway authenticates the token, identifies the wIMPU for this user, and records the association between the external identity and the wIMPU in the wholesale database.

FIG. 3 assumes that the IMS Access Edge Gateway is co-located with the P-CSCF (on the originating side). [In some implementations, a so-called Session Border Controller (SBC) may contain both the P-CSCF and the IMS Access Edge Gateway functions within the signalling plane, as well as an IMS Access Gateway within the media plane.] The IMS Edge Gateway may use the LDAP (or other suitable) protocol to query the wholesale database and obtain the wIMPUs for users A and B. The IMS Edge Gateway includes the wIMPUs in the P-profile-key field of the INVITE. Call setup continues according to defined IMS procedures. Upon receipt of the SIP message at the I-CSCF (terminating side), standard procedures are used to identify the S-CSCF serving user B, based upon the Request-URI. On both the originating side and the terminating side, respective S-CSCFs use the wIMPUs contained in the P-profile-key field to handle the call request; they using initial filter criteria to route the message to one or more SIP Application Servers (ASs).

Figure 5:
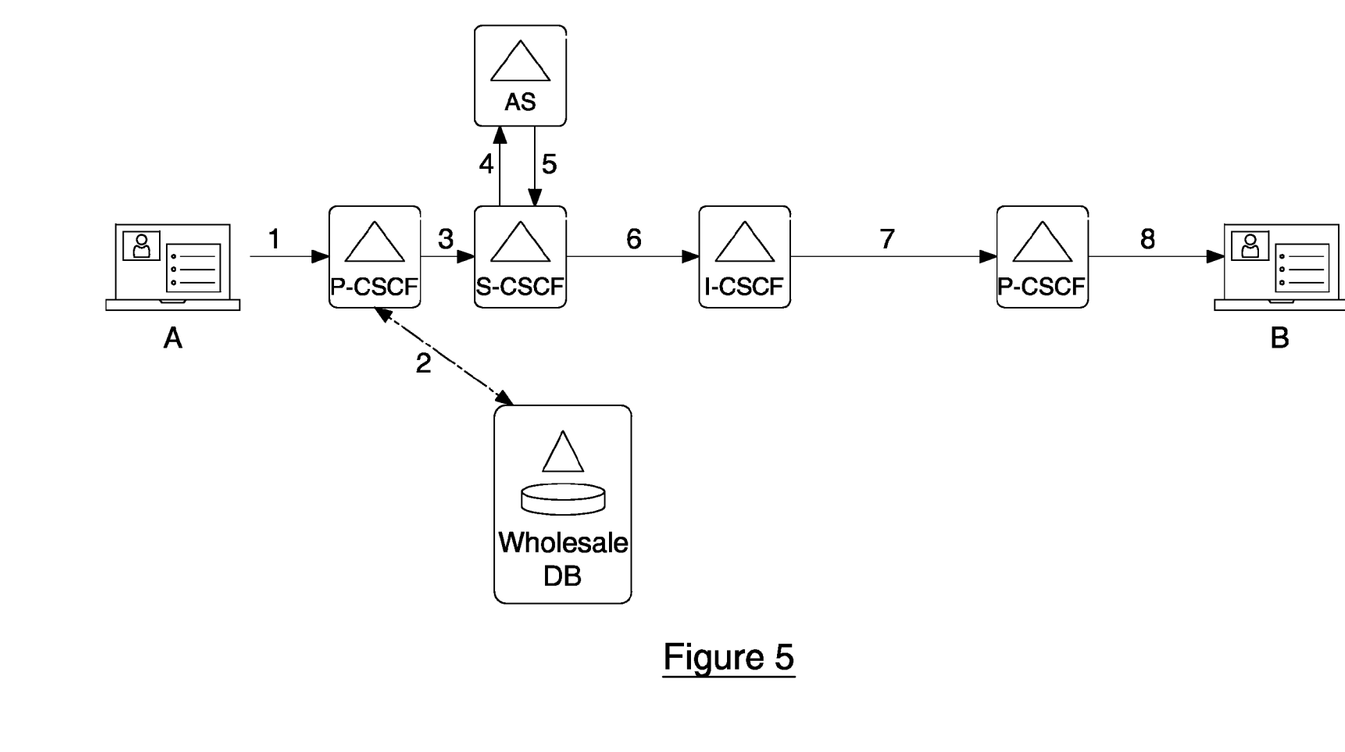
FIG. 5 illustrates a first optimised routing procedure applicable where the terminating user does not require service logic execution in the IMS.

Referring now to FIG. 5, in the case that the terminating side wholesale provider does not require any terminating services—this requirement being recorded in the HSS in association with the WSPs wIMPU—the I-CSCF may forward the SIP message directly to the P-CSCF to which user B is connected. When the I-CSCF contacts the HSS (over the Cx) interface, it will receive in response the identity of that P-CSCF. As there is no requirement for S-CSCF and As(s) handling at the terminating side, there is no need for the Edge Gateway on the originating side to include user B's wIMPU in the INVITE, i.e. only user A's wIMPU is included in the P-profile-key field of the INVITE to allow handling at the originating side S-CSCF and AS(s).

Figure 6:
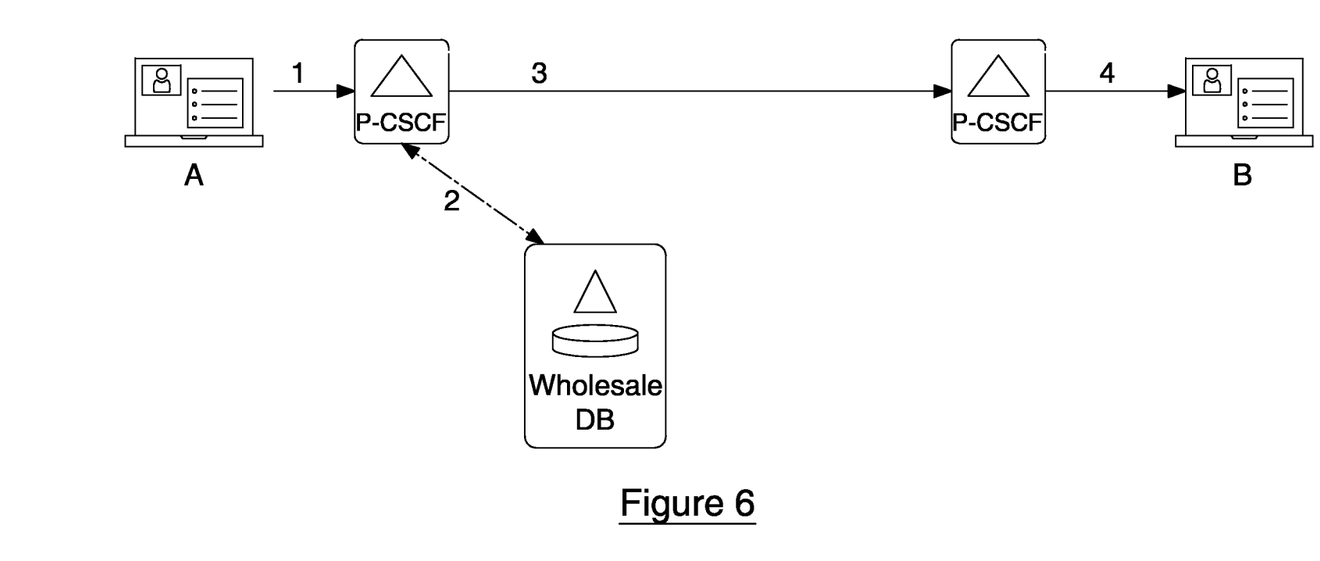
FIG. 6 illustrates a second optimised routing procedure applicable where the both the originating and terminating users do not require service logic execution in the IMS.

A further optimisation is illustrated in FIG. 6, according to which the originating side P-CSCF knows (by configuration or other means) that, for the terminating side WSP (or user B in particular), no service logic is to be executed: this might be the case for a simple voice call. Therefore, the whole IMS core handling could be omitted and the request could be sent directly from the originating P-CSCF to the terminating P-CSCF. In order to route towards the right P-CSCF, the P-CSCF routable id is entered in the wholesale database when the external identity is registered. In this optimised scenario, there is no need to include either user A or user B's wIMPU in the P-profile-key field of the INVITE.

Figure 7:
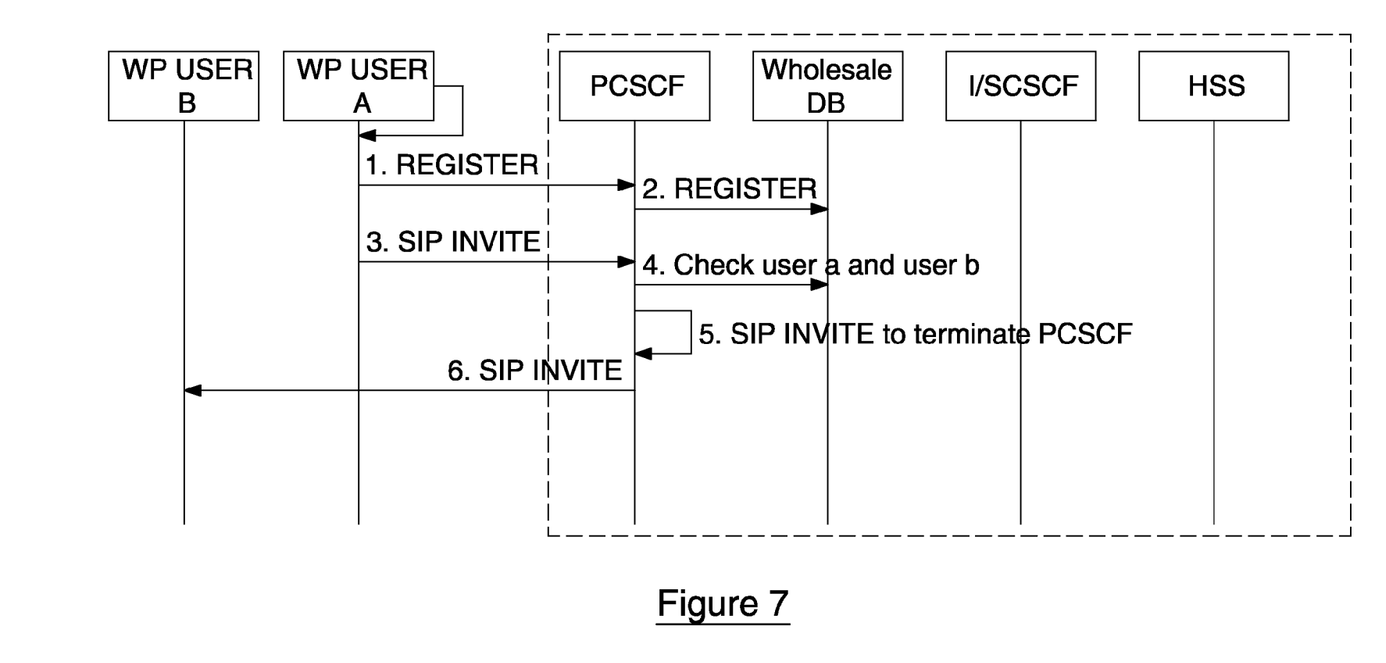
FIG. 7 illustrates the second optimised procedure of FIG. 7 in more detail.

FIG. 7 illustrates in more detail the associated signalling, including the following steps:

4. In the optimized flow, the PCSCF now checks both User A and User B's external identity in the Wholesale DB when the INVITE is received, as well as which services they have available to them. The P-CSCF also determines where User B is located. Assuming that the PCSCF detects that neither user has any services, it can optimize the procedure and send the INVITE directly to the terminating P-CSCF. [NB. If the PCSCF determines that user B is not registered in the wholesale DB it can respond directly to User A to inform it that the call cannot be set-up.]

5. The PCSCF sends the request including the external identities of user A and B to the terminating PCSCF (without having to include the respective wIMPUs in the P-profile-key field of the INVITE).

6. The PSCF sends the request to user B

Figure 8:
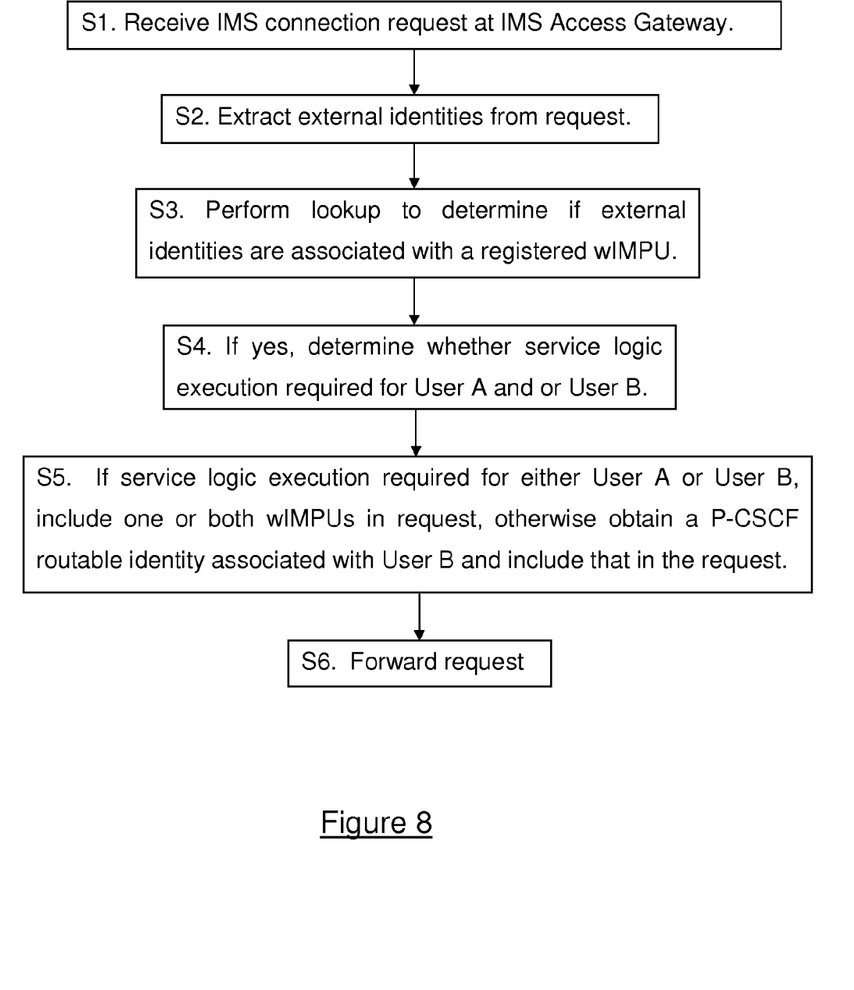
FIG. 8 is a flow diagram showing an optimised procedure for routing an IMS request.
Figure 9:
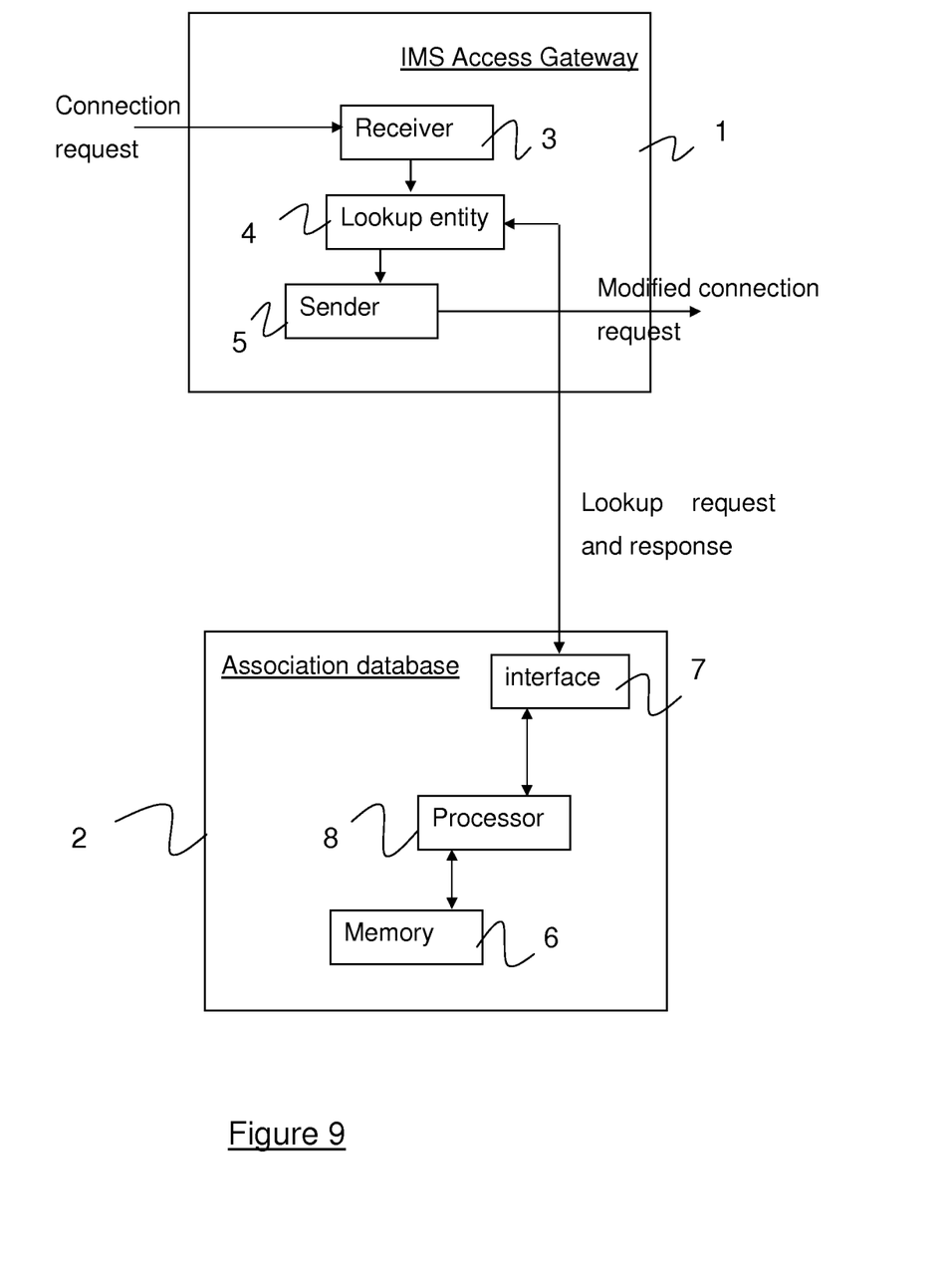
FIG. 9 illustrates schematically both an IMS Access Gateway and an association database.

FIG. 8 is a flow diagram illustrating various steps in an optimised IMS routing procedure, consistent with the embodiments described above. The method comprises a first step, S1, in which the IMS Access Gateway receives an IMS connection request, i.e. from an external network. At step S2, the Access Gateway extracts the external identities. The Access Gateway then determines, at step S3, whether the extracted external identities are registered in respect of a wildcarded IMPU or wildcarded IMPUs that in turn is or are registered in the IMS network. It may do this by contacting the association database. At step S4, it is then further determined whether or not service logic is to be executed in the IMS network for both User A and User B. At step S5, if it is the case that no service logic is to be executed for User A and User B, a P-CSCF routable identity associated with User B is determined, and that identity included in the request. At step S6, the Access Gateway forwards the request FIG. 9 illustrates schematically both an IMS Access Gateway 1 and an association database 2. Considering firstly the IMS Access Gateway, this comprises a receiver 3 for receiving an IP Multimedia Subsystem, IMS, connection request sent by a user of a third party service, User A, towards a peer third party service user, User B, where the originating identity and target identity fields contain respectively external identities of User A and User B. It further comprises a lookup entity 4 for extracting from the request, the external identity contained in the target identity field, and for obtaining a P-CSCF routable identity associated with the external identity. It further comprises a sender 5 for forwarding the request using the P-CSCF routable identity.

Considering now the association database 2, this comprises a memory 6 for recording associations between external user identities and registered wildcarded IMPUs, and, for each external user identity, for recording an indication of whether or not IMS service logic is required when an IMS call session is being established for the external user identity and a P-CSCF routable id. An interface 7 is provided for coupling the apparatus to an IMS Access Gateway. There is further provided a processor 8 for receiving lookup requests, received via the interface 7, from the IMS Access Gateway, a lookup request including external user identities of the originating and target users of a session establishment request. The processor 8 further determines whether the extracted external identities are registered in respect of wildcarded IMPUs that in turn is or are registered in the IMS network and, if so, determines whether or not service logic is to be executed in the IMS network for both the originating and target user and, if not, for determining a P-CSCF routable identity associated with User B and sending this to the IMS Access Gateway via the interface 7.

It will be appreciated by the person of skill in the art that various modifications may be made to the above described embodiments without departing from the scope of the present invention. For example, a Feature Tag that identifies a single instance of an IMS Edge Gateway to which a user has registered may be recorded at the wholesale database, in association with the external identity and the wIMPU. This is used to identify the IMS Edge Gateway at which a user is currently registered.

The solution proposed here makes it possible to support complex wholesale topologies without necessarily affecting the standard IMS core. The solution increases the performance of a complex wholesale solution since no additional routing decision needs to be performed on the terminating side. With this solution, the main part of the IMS core does not have to be traversed in the case that no services are to be executed in the network for the users involved. Moreover, with this solution, both standard retail IMS and wholesale users can share the same infrastructure in an optimal way. It is also possible for the originating side to perform an "early" check to determine if the callee is registered: the call can be terminated early if this is not the case.

The invention claimed is:

1. A method of routing an IP Multimedia Subsystem (IMS) connection request sent by a user of a third party service, User A, towards a peer third party service user, User B, where the originating identity and target identity fields contain respectively external third party identities of User A and User B, the method comprising:
   receiving said request at an IMS Access Gateway to an IMS network;
   extracting said external identities and using them to determine whether or not service logic is to be executed in the IMS network for either one or both of User A and User B and, if not, determining an IMS Edge Node routable identity associated with User B; and
   using the IMS Edge Node routable identity to forward the IMS connection request to a terminating side IMS Edge Node,
   wherein the respective external third party identities are each associated with a wildcarded IP Multimedia Public Identity (IMPU) which is further associated with a service profile.

2. The method according to claim 1, wherein said IMS Edge Node is a P-CSCF.

3. The method according to claim 1, wherein said IMS connection request is a SIP connection request.

4. The method according to claim 3, wherein said originating identity and target identity fields are the P-Preferred-Identity and Request-URI fields respectively.

5. The method according to claim 1, comprising determining whether the extracted external identities are registered in respect of each of the associated wildcarded IMPUs that in turn are registered in the IMS network, wherein the determination of whether or not service logic is to be executed in the IMS network is made if the extracted external identities are determined to be registered in respect of each of the associated wildcarded IMPUs that in turn are registered in the IMS network.

6. The method according to claim 5, wherein said determining whether the extracted external identities are registered in respect of each of the associated wildcarded IMPUs comprises sending each of the associated wildcarded IMPUs to an association database in a lookup request, said IMS Edge Node routable identity being identified at the association database and returned to the IMS Access Gateway.

7. The method according to claim 5, further comprising, in the case that service logic is to be executed in the IMS network for either one or both of User A and User B, including the wildcarded IMPU of the or each User in the IMS connection request.

8. The method according to claim 7, wherein each of the associated wildcarded IMPUs are included in a P-profile-key field.

9. The method according to claim 1, wherein said IMS Access Gateway is co-located with a Proxy Call Session Control Function (P-CSCF).

10. An IMS Access Gateway comprising:
    a receiver for receiving an IP Multimedia Subsystem (IMS) connection request sent by a user of a third party service, User A, towards a peer third party service user, User B, where the originating identity and target identity fields contain respectively external identities of User A and User B;
    a lookup entity for
        extracting from said request, the external identity contained in the target identity field,
        obtaining an IMS Edge Node routable identity associated with the external identity; and
    a sender for forwarding the request using said IMS Edge Node routable identity, wherein the respective external identities are each associated with a wildcarded IP Multimedia Public Identity (IMPU) which is further associated with a service profile.

11. The IMS Access Gateway according to claim 10, said lookup entity being configured to obtain an IMS Edge Node routable identity by:
    sending a lookup request containing the extracted external identity to an association database, and
    receiving a response from the association database including said IMS Edge Node routable identity.

12. The IMS Access Gateway according to claim 10, wherein said lookup entity is configured to extract from said request, the external identity contained in the originating identity field and to obtain the wildcarded IMPUs associated with either one or both of User A and User B, instead of an IMS Edge Node routable identity, and to include the wildcarded IMPU(s) in the request, the sender being configured to forward the request including the wildcarded IMPU(s).

13. The IMS Access Gateway according to claim 12, wherein said IMS connection request is a SIP connection request and said lookup entity is configured to include the wildcarded IMPU(s) in a P-Profile-key field of the connection setup request.

14. The IMS Access Gateway according to claim 10, comprising an interface for coupling the Gateway to an association database, said lookup entity being configured to communicate with the association database over said interface.

15. The IMS Access Gateway according to claim 10, comprising an interface for coupling the Gateway to a Proxy Call Session Control Function, P-CSCF, to allow the Gateway to be co-located with the P-CSCF.

16. The IMS Access Gateway according to claim 10, wherein said IMS connection request is a SIP connection request, and said lookup entity is configured to extract the external identity (identities) from the P-Preferred-Identity (and Request-URI fields).

17. The IMS Access Gateway according to claim 10, wherein said IMS Edge Node is a P-CSCF.

18. An apparatus configured to operate as an association database and comprising:
    a memory for recording associations between external user identities and registered wildcarded IMPUs, and, for each external user identity, for recording an indication of whether or not IMS service logic is required when an IMS call session is being established for the external user identity and an IMS Edge Node routable id;

an interface for coupling the apparatus to an IMS Access Gateway; and a processor and memory containing instructions that, when executed by the processor, cause the apparatus to:
receive lookup requests, received via said interface, from the IMS Access Gateway, a lookup request including external user identities of the originating and target users of a session establishment request,
determine whether the extracted external identities are registered in the IMS network and, if so, determine whether or not service logic is to be executed in the IMS network for either one of or both the originating and target user and, if not, determine an IMS Edge Node routable identity associated with User B and sending the IMS Edge Node routable identity to the IMS Access Gateway via said interface,
wherein the extracted external identities are each associated with a wildcarded IP Multimedia Public Identity (IMPU) which is further associated with a service profile.

19. The apparatus according to claim 18, wherein said determining whether the extracted external identities are registered in the IMS network comprises determining whether or not the extracted external identities are registered in the IMS in respect of the associated wildcarded IMPUs.

20. A non-transitory computer-readable medium bearing computer program code embodied therein for use with a computer in order to route an IP Multimedia Subsystem, IMS, connection request sent by a user of a third party service, User A, towards a peer third party service user, User B, where the originating identity and target identity fields contain respectively external third party identities of User A and User B, the computer program code comprising code to perform the method of:
receiving said request at an IMS Access Gateway to an IMS network;
extracting said external identities and determining whether the extracted external identities are registered in the IMS network and, if so, determining whether or not service logic is to be executed in the IMS network for either one or both of User A and User B and, if not, determining an IMS Edge Node routable identity associated with User B; and
using the IMS Edge Node routable identity to forward the IMS connection request to a terminating side IMS Edge Node,
wherein the extracted external identities are each associated with a wildcarded IP Multimedia Public Identity (IMPU) which is further associated with a service profile.

21. The non-transitory computer-readable medium according to claim 20, wherein said determining whether the extracted external identities are registered in the IMS network includes determining whether or not the extracted external identities are registered in the IMS in respect of the associated wildcarded IMPUs.

* * * * *